United States Patent
Hinz et al.

(10) Patent No.: US 6,762,278 B2
(45) Date of Patent: Jul. 13, 2004

(54) PROCESS FOR THE COPOLYMERIZATION OF ALKYLENE OXIDES AND CARBON DIOXIDE USING SUSPENSIONS OF MULTI-METAL CYANIDE COMPOUNDS

(75) Inventors: Werner Hinz, Grosse Ile, MI (US); Edward Michael Dexheimer, Grosse Ile, MI (US); Edward Bohres, Ludwigshafen (DE); Georg Heinrich Grosch, Bad Durkheim (DE)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 10/066,855

(22) Filed: Feb. 4, 2002

(65) Prior Publication Data

US 2003/0149232 A1 Aug. 7, 2003

(51) Int. Cl.[7] .............................................. C08G 64/34
(52) U.S. Cl. ................. 528/405; 528/411; 528/412; 528/415; 528/419; 528/421; 521/172
(58) Field of Search ............................ 528/405, 411, 528/412, 415, 419, 421; 521/172

(56) References Cited

U.S. PATENT DOCUMENTS

| | | |
|---|---|---|
| 4,472,560 A | 9/1984 | Kuyper et al. ............... 526/120 |
| 4,500,704 A | 2/1985 | Kruper, Jr. et al. ......... 528/405 |
| 4,826,887 A | 5/1989 | Kuyper et al. ............... 521/189 |
| 4,826,952 A | 5/1989 | Kuyper et al. ............... 528/405 |
| 4,826,953 A | 5/1989 | Kuyper et al. ............... 528/405 |
| 2003/0032761 A1 | 2/2003 | Hofmann et al. |

*Primary Examiner*—David J. Buttner
(74) *Attorney, Agent, or Firm*—Fernando A. Borrego

(57) ABSTRACT

A method of forming a polyethercarbonate polyol using a multimetal cyanide compound is disclosed. The method includes providing a multimetal cyanide compound having a crystalline structure and a content of platelet-shaped particles of at least 30% by weight, based on the weight of the multimetal cyanide compound and further including at least two of the following components: an organic complexing agent, water, a polyether, and a surface-active substance. Then an alcohol initiator is reacted with at least one alkylene oxide and carbon dioxide under a positive pressure in the presence of the multimetal cyanide compound, thereby forming the polyethercarbonate polyol.

20 Claims, No Drawings

PROCESS FOR THE COPOLYMERIZATION OF ALKYLENE OXIDES AND CARBON DIOXIDE USING SUSPENSIONS OF MULTI-METAL CYANIDE COMPOUNDS

TECHNICAL FIELD

The present invention relates to an improved process for the copolymerization of alkylene oxides and carbon dioxide using multimetal cyanide compounds as catalysts. The present invention permits one to efficiently form polyethercarbonate polyols with better incorporation of carbon dioxide into the polyol.

BACKGROUND OF THE INVENTION

Polyethercarbonate polyols are the polymerization reaction product of an initiator, at least one alkylene oxide and carbon dioxide. The carbon dioxide is incorporated into the backbone of the polyol chain. A number of catalyst systems have been used to form polyethercarbonate polyols with varying degrees of success. One difficulty has been the generally low reactivity of carbon dioxide in the catalytic systems to date, in particular the generally observed decreasing rate of reaction with increasing $CO_2$ pressure (L Chen, Rate of regulated copolymerization involving $CO_2$, J Natural Gas Chemistry, 1998, 7, 149–156), thus requiring very high levels of catalyst to produce any product having incorporation of a significant amount of carbon dioxide into the polyol. A second difficulty is the generally high rate of formation of cyclic by products such as propylene carbonate. Finally, most procedures produce a very viscous product having a large degree of polydispersity.

In an attempt to better control the reaction and to increase the carbon dioxide incorporation, several forms of double metal cyanide (DMC) complexes have been used in the past. These are disclosed in the following U.S. Pat. Nos. 4,472,560; 4,500,704; 4,826,887; 4,826,952; and 4,826,953. These DMC procedures, however, still suffer from slow reaction rates, required high catalyst concentrations and have high levels of by-product formation. Polyethercarbonate polyols produced using these DMC catalysts also have high viscosities and high degrees of polydispersity. Thus there is a need for an improved catalyst system for polyethercarbonate polyol formation.

Most double metal cyanide complexes are amorphous structures and are used in the form of powders. In the present invention it has been found that much better results are obtained using crystalline multimetal cyanide compounds in a form which gives them a very high catalytic activity. In a preferred embodiment crystalline multimetal cyanide compounds are suspended in organic or inorganic liquids and used as catalysts in this form. It is particularly advantageous for the suspended multimetal cyanide compound to have a platelet-like morphology.

SUMMARY OF THE INVENTION

In one embodiment, the present invention is a method of forming a polyethercarbonate polyol comprising the steps of: providing a multimetal cyanide compound having a crystalline structure and a content of platelet-shaped particles of preferably at least 30% by weight, based on the weight of the multimetal cyanide compound and further comprising at least two of the following: an organic complexing agent, water, a polyether, and a surface-active substance; and reacting an alcohol initiator with at least one alkylene oxide and carbon dioxide under a positive pressure in the presence of the multimetal cyanide compound, thereby forming the polyethercarbonate polyol.

DETAILED DESCRIPTION OF PREFERRED EMBODIMENTS

In the present invention a unique multimetal cyanide compound is used. The compound is crystalline and preferably has a platelet-like morphology. In addition, the catalyst is preferably used in the form of a suspension, which gives it unique activity. The multimetal cyanide compound of the present invention provides different activity than past DMC complexes.

The multimetal compound of the present invention comprises at least three components. First, at least one multimetal cyanide compound having a crystalline structure and a content of platelet-shaped particles of at least 30% by weight, based on the multimetal cyanide compound. Second the compound includes at least two of the following components: an organic complexing agent, water, a polyether, and a surface-active substance.

The organic complexing agent comprises, in particular, one of the following: alcohols, ethers, esters, ketones, aldehydes, carboxylic acids, amides, nitrites, sulfides and mixtures thereof.

As polyethers, use is made, in particular, of polyether alcohols, preferably hydroxyl-containing polyaddition products of ethylene oxide, propylene oxide, butylene oxide, vinyloxirane, tetrahydrofuran, 1,1,2-trimethylethylene oxide, 1,1,2,2-tetramethylethylene oxide, 2,2-dimethyloxetane, diisobutylene oxide, α-methylstyrene oxide and mixtures thereof.

As the surface-active substance, use is made, in particular, of compounds selected from the group comprising $C_4$–$C_{60}$-alcohol alkoxylates, block copolymers of alkylene oxides of differing hydrophilicity, alkoxylates of fatty acids and fatty acid glycerides, block copolymers of alkylene oxides and polymerizable acids and esters.

The crystalline multimetal cyanide compounds used according to the present invention are preferably prepared by the following method. First, addition of an aqueous solution of a water-soluble metal salt of the formula $M^1_m(X)_n$ to an aqueous solution of cyanometalate compound of the formula $H_aM^2(CN)_b(A)_c$. Wherein for the formula $M^1_m(X)_n$: $M^1$ is at least one metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Fe^{3+}$, $Mo^{4+}$, $Mo^{6+}$, $Al^{3+}$, $V^{5+}$, $Sr^{2+}$, $W^{4+}$, $W^{6+}$, $Cu^{2+}$, $Cr^{2+}$, $Cr^{3+}$, $Cd^{2+}$, $Hg^{2+}$, $Pd^{2+}$, $Pt^{2+}$, $Vt^{2+}$, $Mg^{2+}$, $Ca^{2+}$, $Ba^{2+}$, and mixtures thereof; X is at least one anion selected from the group consisting of halide, hydroxide, sulfate, carbonate, cyanide, thiocyanate, isocyanate, carboxylate, in particular formate, acetate, propionate or oxalate; and nitrate and m and n are integers which satisfy the valence of $M^1$, and X. Wherein for the formula $H_aM^2(CN)_b(A)_c$: $M^2$ is at least one metal ion selected from the group consisting of $Fe^{2+}$, $Fe^{3+}$, $Co^{3+}$, $Cr^{3+}$, $Mn^{2+}$, $Mn^{3+}$, $Rh^{3+}$, $Ru^{2+}$, $Ru^{3+}$, $V^{4+}$, $V^{5+}$, $Co^{2+}$, $Ir^{3+}$, and $Cr^{2+}$ and $M^2$ can be identical to or different from $M^1$; H is hydrogen or a metal ion, usually an alkali metal ion, an alkaline earth metal ion or an ammonium ion; A is at least one anion selected from the group consisting of halide, hydroxide, sulfate, carbonate, cyanate, thiocyanide, isocyanate, carboxylate and nitrate, in particular cyanide, where A can be identical to or different from X; and a, b and c are integers selected so that the cyanide compound is electrically neutral.

In an alternative, one or both aqueous solutions may, if desired, comprise at least one water-miscible, heteroatom-containing ligand selected from the group comprising alcohols, ethers, esters, ketones, aldehydes, carboxylic acids, amides, sulfides or mixtures of at least two of the components mentioned, and at least one of the two solutions comprises a surface-active substance.

Also if desired, combination of the aqueous suspension formed in the first step above can be made with a water-miscible, heteroatom-containing ligand selected from the above-described group which can be identical to or different from the ligand in the first step.

In a second step, if desired, the multimetal cyanide compound can be separated from the suspension.

The procedure produces platelet-like shaped crystalline multimetal cyanide compounds. The compounds can have a cubic, tetragonal, trigonal, orthorhombic, hexagonal, monoclinic or triclinic crystal structure. The definition of the crystal systems describing these structures and the space groups belonging to the abovementioned crystal systems may be found in "International tables for crystallography", Volume A, editor: Theor Hahn, (1995).

For the preparation of multimetal cyanide compounds which are used for the suspensions of the present invention, it is advantageous, but not necessary, to use the cyanometalic acid as a cyanometalate compound, since this does not result in formation of a salt as a by-product.

These cyanometalic acids (hydrogen cyanometalates), which are preferably used, are stable and readily handeable in aqueous solution. They can be prepared, for example as described in W. Klemm, W. Brandt, R. Hoppe, Z. Anorg, Allg. Chem. 308, 179 (1961), starting from the alkali metal cyanometalate via the silver cyanometalate and then to the cyanometalic acid. A further possibility is to convert an alkali metal or alkaline earth metal cyanometalate into a cyanometalic acid by means of an acid ion exchanger, as described, for example, in F. Hein, H. Lilie, Z. Anorg, Allg. Chem. 270, 45 (1952), or A. Ludi, H. U. Güdel, V. Dvorak, Helv. Chim, Acta 50, 2035 (1967). Further possible ways of synthesizing the cyanometalic acids may be found, for example, in "Handbuch der Präparativen Anorganischen Chemie", G. Bauer (editor), Ferdinand Enke Verlag, Stuttgart, 1981. For an industrial preparation of these compounds, as is necessary for the process of the present invention, the synthesis via ion exchangers is the most advantageous route. After they have been synthesized, the cyanometalic acid solutions can be processed further immediately, but it is also possible to store them for a relatively long period. Such storage should be carried out in the absence of light to prevent decomposition of the acid.

The proportion of the acid in the solution should be greater than 80% by weight, based on the total mass of cyanometalate complexes, preferably greater than 90% by weight, in particular greater than 95% by weight.

As heteroatom-containing ligands, use is made of the above-described organic substances. In a preferred embodiment of the preparation process, no heteroatom-containing ligand is added to the solutions in the first step and the addition of heteroatom-containing ligand to the suspension of precipitate is also omitted in the second step. In a preferred embodiment, only the at least one surface-active component is added, as mentioned above, to one or both of the solutions in the first step.

The surface-active compounds used according to the present invention can be anionic, cationic, nonionic and/or polymeric surfactants. In particular, nonionic and/or polymeric surfactants are used. Compounds selected from this group are, in particular, fatty alcohol alkoxylates, block copolymers of various epoxides having differing hydrophilicity, castor oil alkoxylates or block copolymers of epoxides and other monomers, e.g. acrylic acid or methacrylic acid.

Fatty alcohol alkoxylates used according to the present invention have a fatty alcohol comprising 8–36 carbon atoms, in particular 10–18 carbon atoms. This is alkoxylated with ethylene oxide, propylene oxide and/or butylene oxide. The polyether part of the fatty alcohol alkoxylate used according to the present invention can consist of pure ethylene oxide, propylene oxide or butylene oxide polyethers. Furthermore, it is also possible to use copolymers of two or three different alkylene oxides or else block copolymers of two or three different alkylene oxides. Fatty alcohol alkoxylates which have pure polyether chains are, for example, Lutensol AO grades from BASF AG. Fatty alcohol alkoxylates having block copolymers as polyether part are Plurafac LF grades from BASF Aktiengesellschaft. The polyether chains particularly preferably consist of from 2 to 50, in particular from 3 to 15, alkylene oxide units.

Block copolymers as surfactants comprise two different polyether blocks which differ in their hydrophilicity. Block copolymers which can be used according to the present invention may comprise ethylene oxide and propylene oxide (Pluronic grades, BASF Aktiengesellschaft). The water solubility is controlled via the lengths of the various blocks. The molar masses are in the range from 500 Da to 20,000 Da, preferably from 1,000 Da to 6,000 Da and in particular 1,500–4,000 Da. In the case of ethylene-propylene copolymers, the proportion of ethylene oxide is from 5 to 50% by weight and the proportion of propylene oxide is from 50 to 95% by weight.

Copolymers of alkylene oxide with other monomers which can be used according to the present invention preferably have ethylene blocks. The other monomer can be, for example, butyl methacrylate (PBMA/PEO BE1010/BE1030, Th. Goldschmidt), methyl methacrylate (PMMA/PEO ME1010/ME1030, Th. Goldschmidt) or methacrylic acid (EA-300, Th. Goldschmidt).

The surface-active substances used should have a moderate to good solubility in water.

To prepare the crystalline multimetal cyanide compounds used according to the present invention, an aqueous solution of a cyanometalic acid or of a cyanometalate salt is combined with the aqueous solution of a metal salt of the formula $M^1{}_m(X)_n$, where the symbols are as defined above. Here, a stoichiometric excess of the metal salt is employed. The molar ratio of the metal ion to the cyanometalate component is preferably from 1.1 to 7.0, more preferably from 1.2 to 5.0 and particularly preferably from 1.3 to 3.0. It is advantageous to place the metal salt solution in the precipitation vessel first and to add the cyanometalate compound, but the reverse procedure can also be used. During and after combining the starting solutions, good mixing, for example by stirring, is necessary.

The content of the cyanometalate compound in the cyanometalate starting solution based on the mass of cyanometalate starting solution is from 0.1 to 30% by weight, preferably from 0.1 to 20% by weight, in particular from 0.2 to 10% by weight. The content of the metal salt component in the metal salt solution based on the mass of metal salt solution is from 0.1 to 50% by weight, preferably from 0.2 to 40% by weight, in particular from 0.5 to 30% by weight.

The surface-active substances are generally added beforehand to at least one of the two solutions. The surface-active substances are preferably added to the solution which is initially charged in the precipitation. The content of surface-active substances in the precipitation suspension based on the total mass of the precipitation suspension is from 0.01 to 40% by weight. Preference is given to a content of from 0.05 to 30% by weight.

A further preferred embodiment provides for the surface-active substances to be divided proportionately among the two starting solutions.

The heteroatom-containing ligands are, in particular, added to the suspension formed after combination of the two starting solutions. Here too, good mixing has to be ensured.

It is also possible, however, to add all or some of the ligand to one or both starting solutions. In this case, owing to the change in the salt solubility, the ligand is preferably added to the solution of the cyanometalate compound.

The content of the ligand in the suspension formed after the precipitation should be from 1 to 60% by weight, preferably from 5 to 40% by weight, in particular from 10 to 30% by weight.

The multimetal cyanide compounds used according to the present invention preferably have X-ray diffraction patterns as are shown in FIGS. 3 and 4 of DE 197 42 978.

The multimetal cyanide compounds used for preparing the suspensions of the present invention preferably comprise primary crystals having a platelet-like morphology. For the purposes of the present invention, platelet-shaped particles are particles whose thickness is one third, preferably one fifth, particularly preferably one tenth, of their length and width. The preferred catalyst according to the present invention contains more than 30% by weight of such platelet-shaped crystals, preferably more than 50% by weight, particularly preferably more than 70% by weight and very particularly preferably more than 90% by weight. The preferred multimetal cyanide compounds according to the present invention can be seen in scanning electron micrographs.

Multimetal cyanide compounds which are less preferred according to the present invention are often either in rod form or in the form of small cube-shaped or spherical crystals.

Depending on how pronounced the platelet character of the particles is and how many are present in the catalyst, it is possible that distinct to strong intensity changes in the individual reflections in the X-ray diffraction pattern compared to rod-shaped multimetal cyanide compounds of the same structure will occur.

The multimetal cyanide compounds produced by precipitation according to the above-described process can then be separated from the suspension by filtration or centrifugation. After the separation, the multimetal cyanide compounds can then be washed one or more times. Washing can be carried out using water, the abovementioned heteroatom-containing ligands or mixtures thereof. Washing can be carried out in the separation apparatus (e.g. filtration apparatus) itself or be carried out in separate apparatuses, by, for example, resuspension of the multimetal cyanide compound in the washing liquid and separating it from the liquid again. This washing can be carried out at from 10° C. to 150° C., preferably from 15 to 60° C.

The multimetal cyanide compound can subsequently be dried at from 30° C. to 180° C. and pressures of from 0.001 bar to 2 bar, preferably from 30° C. to 100° C. and pressures of from 0.002 bar to 1 bar. Drying can also be omitted, in which case a moist filter cake is obtained.

A preferred embodiment of the preparation process for the multimetal cyanide compound used according to the present invention provides for no organic, heteroatom-containing ligand, as has been defined above, apart from the surface-active substance to be added before, during or after the precipitation. In this embodiment of the preparation process, in which no further organic, heteroatom-containing ligands apart from the surface-active substance are used, the multimetal cyanide compound is washed with water after separation from the precipitation suspension.

The multimetal cyanide compounds prepared as described above are used in the form of the suspensions of the present invention for preparing polyethercarbonate polyols.

Both the moist and the dried multimetal cyanide compounds can be used as starting materials for the suspensions of the present invention. The pulverulent, dried multimetal cyanide compounds are, to prepare the suspensions of the present invention, dispersed as finely as possible in the suspension liquid by an efficient dispersion procedure in order to achieve a very high activity of the multimetal cyanide catalyst. Such methods of efficiently producing a very finely dispersed suspension are, inter alia, stirring under high shear forces, e.g. in homogenizers or Ultraturrax apparatuses, and also the use of dispersion machines, in particular ball mills and agitated ball mills, e.g. bead mills in general and particularly those having small milling beads (e.g. 0.3 mm diameter) such as the double-cylinder bead mills (DCP-Super Flow®) from Draiswerken GmbH, Mannheim, or the centrifugal fluidized bed mills from Netzsch Gerätebau GmbH, Selb. If desired, dissolvers can be used for predispersion. Furthermore, small amounts of dispersants known to those skilled in the art, e.g. lecithin, zinc oleate or zinc stearate, can be used. In addition, all methods which allow the powder to be dispersed very finely in liquids are suitable. Dispersion can be carried out at from 10° C. to 150° C., preferably from 30° C. to 120° C. Dispersion liquids which can be used are polyethers, organic liquids or water, and also mixtures thereof.

As polyethers for the dispersion, it is possible to use compounds having molar masses of from 150 to 6,000 dalton and functionalities of from 1 to 8. Preference is given to using polyethers having molar masses of from 150 to 2,000 dalton and functionalities of from 1 to 3, in particular molar masses of from 150 to 800 dalton.

If the predried multimetal cyanide compound is suspended in an organic liquid, suspensions having solids contents of less than 10% by weight are preferred. Particular preference is given to solids contents of less than 5% by weight. Organic liquids which can be used are heteroatom-containing compounds and also hydrocarbons or mixtures thereof. Compounds which have a vapor pressure of greater than 0.005 bar at 100° C.

If the predried multimetal cyanide compound is suspended in water, preference is given to suspensions having solids contents of less than 20% by weight and pastes having solids contents of less than 60% by weight. The water content of the pastes and suspensions should then be above 20% by weight.

Preference is given to omitting the drying step. In this case, the moist multimetal cyanide compounds are used for preparing the suspensions of the present invention. For this purpose, a suspension is prepared from the moist multimetal cyanide compound after precipitation and separation of the precipitate from the suspension and after washing of the multimetal cyanide compound, either on the filtration apparatus or externally with filtration being repeated again, but without carrying out a drying step. The multimetal cyanide compound can, as in the case of the dried multimetal cyanide compounds, be suspended in the abovementioned dispersion media. The methods of preparing a very finely divided suspension which have been described for the dried multimetal cyanide compounds can also be used for dispersing the undried multimetal cyanide compounds.

When using moist multimetal cyanide compounds for preparing suspensions in at least one polyether or a similarly high-boiling liquid, heat and vacuum can, in a preferred embodiment, be applied simultaneously during the dispersion step in order to remove volatile constituents such as water or organic ligands. In the present context, application of vacuum means both the normal vacuum stripping at pressures down to 0.001 bar and also the combination of vacuum treatment and stripping with inert gases such as nitrogen, argon, helium, etc. The temperature in this step can be from 10° C. to 150° C., preferably from 30° C. to 120° C.

In the case of multimetal cyanide suspensions in polyethers, suspensions having solids contents of less than 20% by weight are preferred. Particular preference is given to solids contents of less than 10% by weight, in particular less than 5% by weight. If the undried multimetal cyanide compound is suspended in organic liquids, as described above, suspensions having solids contents of less than 10% by weight are preferred. Particular preference is given to solids contents of less than 5% by weight. If the undried multimetal cyanide compound is suspended in water, suspensions having solids contents of less than 20% by weight and pastes having solids of less than 60% by weight are preferred. The water content of the pastes and suspensions should then be above 20% by weight.

If the starting materials used for preparing the multimetal cyanide compound are cyanometalic acid and, as the metal salt, a salt of an acid which has a vapor pressure of greater than 0.005 bar at 100° C., the suspensions of the present invention can be prepared according to the following advantageous embodiment. Here, the precipitation is carried out in the presence of the surface-active agent and optionally the organic ligand. If an organic ligand is used, the organic ligand should likewise have a vapor pressure of greater than 0.005 bar at 100° C. After combining the starting material solutions, polyether is added to the precipitation suspension and the acid formed during the precipitation, the water and at least part of the organic ligands are distilled off, if desired under reduced pressure. The remaining suspension has, according to the present invention, a solids content of less than 20% by weight and a polyether content of greater than 80% by weight. The possible polyethers are defined above. Preference is given to polyether alcohols having molar masses of from 150 to 2,000 dalton, so that the resulting suspension can be used directly as catalyst for preparing polyether alcohols.

The multimetal cyanide suspensions prepared by the method according to the present invention are very useful as catalysts for the synthesis of polyethercarbonate polyols having functionalities of from 1 to 8, preferably from 1 to 4, and number average molar weights of from 200 to 20,000. The polyethercarbonate polyols are formed by addition polymerization of alkylene oxides and carbon dioxide onto H-functional initiator substances, like mono-alcohols and poly-alcohols.

To prepare polyethercarbonate polyols using the catalysts of the present invention, it is possible to employ a large number of compounds having at least one alkylene oxide group, for example ethylene oxide, 1,2-epoxypropane, 1,2-methyl-2-methylpropane, 1,2-epoxybutane, 2,3-epoxybutane, 1,2-methyl-3-methylbutane, 1,2-epoxypentane, 1,2-methyl-3-methylpentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, styrene oxide, 1,2-epoxycyclopentane, 1,2-epoxycyclohexane, (2,3-epoxypropyl)-benzene, vinyloxirane, 3-phenoxy-1,2-epoxypropane, 2,3-epoxy(methyl ether), 2,3-epoxy (ethyl ether), 2,3-epoxy (isopropyl ether), 2,3-epoxy-1-propanol, 3,4-epoxybutyl stearate, 4,5-epoxypentyl acetate, 2,3-epoxy propyl methacrylate, 2,3-epoxypropyl acrylate, glycidol butyrate, methyl glycidate, ethyl 2,3-epoxybutanoate, 4-(trimethylsilyl)butane 1,2-epoxide, 4-(trimethylsilyl)butane 1,2-epoxide, 3-(perfluoromethyl)propene oxide, 3-perfluoromethyl) propene oxide, 3-(perfluorobutyl)propene oxide, and also any mixtures of at least two of the abovementioned compounds.

The desired carbon dioxide content of the polyethercarbonate polyol is preferably from 1 to 30%, more preferably from 2 to 20%, and most preferably from 5 to 15%, based on weight % of $CO_3$ of the polyethercarbonate polyol. The catalyst concentrations employed are less than 1% by weight, preferably less than 0.5% by weight, particularly preferably less than 1,000 ppm, very particularly preferably less than 500 ppm and especially preferably less than 100 ppm, based on the total mass of the polyethercarbonate polyol. The polyethercarbonate polyols can be prepared either batchwise, semi-continuously or fully continuously. The process temperatures which can be employed in the synthesis are in the range from 40° C. to 180° C., with preference being given to temperatures in the range from 90° C. to 130° C. Temperatures above 180° C. may result in catalyst decomposition and thus reduce catalyst activity. The carbon dioxide pressure during the reaction influences the amount of carbon dioxide incorporation. The carbon dioxide pressure may vary widely and range from 10 to 3,000 pounds per square inch (psi), preferably from 90 to 2,500 psi, and more preferably from 90 to 2,000 psi.

To prepare the polyethercarbonate polyols using the catalysts of the present invention, it is possible to employ other typical polyol initiator compounds preferably those having at least one alkylene oxide group. Suitable initiator compounds include alkanols such as butanol, diols, such as butane diol, glycols such as dipropylene glycol, glycol monoalkyl ethers, aromatic hydroxy compounds, trimethylol propane, and pentaerythritol. Preferably the initiator should include one or more alkylene oxide groups for the catalyst to function efficiently. Thus, preferably the initiator is first reacted with at least one alkylene oxide to form an oligomer prior to it use to form the polyethercarbonate polyol. Examples include glycerine having from 1 to 6 propylene oxides attached to it, propylene glycol having 1 to 6 propylene oxides, trimethyl propane with 1 to 6 propylene oxides, dipropylene glycol with one or more alkylene oxides attached, sucrose with one or more alkylene oxides attached, sorbitol with one or more alkylene oxides attached, and blends of these oligomers. As would be understood by one of ordinary skill in the art, the oligomer can be reacted with either the same alkylene oxide used during its formation or with another alkylene oxide in the polyethercarbonate polyol formation reaction. The present invention also relates to the preparation of polyurethane forming compositions based on the herein described polyethercarbonate polyols and to polyurethane compounds obtained from said polyurethane forming compositions. To obtain polyurethane compounds, polyethercarbonate polyols may be reacted with compounds which are used in conventional polyurethane forming compositions for the preparation of polyurethanes, such as isocyanates, catalysts, blowing agents, stabilizers, etc.

The isocyanates that may be used include isomers and derivatives of toluene diisocyanate (TDI) and diphenylmethane diisocyanate (MDI). The reaction between the hydroxyl and the isocyanate groups may be catalyzed by tertiary amine catalysts and/or organic tin compounds such as stannous octoate and dibutyltin dilaureate. To obtain a foamed polyurethane, blowing agents may be employed. In addition, stabilizers and flame retardants may be added.

EXAMPLES

A multimetal cyanide catalyst according to the present invention was prepared as described above. Several comparative DMC catalysts were prepared as described below to illustrate the usefulness of the present catalyst compared to typical DMC catalysts.

Preparation of Hexacyanocobaltic Acid

An amount of 7 liters of strong acid ion exchanger in the sodium form (Amberlite® 252 Na, Rohm & Haas) was introduced into an ion exchange column (length: 1 m, volume: 7.7 1). The ion exchanger was subsequently converted into the H form by passing 10% strength hydrochloric acid through the ion exchange column for 9 hours at a rate of 2 bed volumes per hour, until the sodium content of the discharged solution was less than 1 ppm. The ion exchanger was subsequently washed with water until neutral. The regenerated ion exchanger was then used to prepare a hexacyanocobaltic acid which was essentially free of alkali metal. For this purpose, a 0.24 molar solution of potassium hexacyanocobaltate in water was passed through the ion exchanger at a rate of 1 bed volume per hour. After 2.5 bed volumes, the feed was changed from potassium hexacyanocobaltate solution to water. The 2.5 bed volumes obtained had an average hexacyanocobaltic acid content of 4.5% by weight and alkali metal contents of less than 1 ppm. The hexacyanocobaltic acid solutions used for the further examples were diluted appropriately with water.

Preparation of a Multimetal Cyanide Compound Catalyst Suspension

An amount of 479.3 g of an aqueous zinc acetate solution (13.8 g of zinc acetate dihydrate and 2.2 g of polyether Pluronic® PE 6200 (BASF Aktiengesellschaft) dissolved in 150 g of water) were heated to 50° C. While stirring (screw stirrer, stirring energy input: 1W/1), 558 g of an aqueous hexacyanocobaltic acid solution (cobalt content: 9 g/1, 1.5% by weight of Pluronic® PE 6200 (BASF Aktiengesellschaft), based on the hexacyanocobaltic acid solution) were then metered in over a period of 20 minutes. After all the hexacyanocobaltic acid solution had been metered in, the mixture was stirred for a further 5 minutes at 50° C. The temperature was subsequently reduced to 40° C. over a period of one hour. The precipitated solid was separated from the liquid by means of a pressure filter and washed with water. The moist filter cake was subsequently dispersed in the amount of liquid required to give a 5% strength by weight multimetal cyanide suspension.

Preparation of Comparative DMC Catalysts

Comparative DMC catalyst example one was prepared as follows. A first solution was prepared by dissolving an amount of 50 grams (g) of $K_3[Co(CN)_6]$, 0.15 moles, in 1200 milliliters (mL) of $H_2O$ and 140 mL tert-butyl alcohol. The first solution was added to a 3 Liter, 4-neck round bottom flask equipped with a stirrer and a thermometer, and warmed to 40° C. A second solution was prepared comprising 51 g of $ZnCl_2$, 0.375 moles, dissolved in 200 mL $H_2O$ and 15 mL of tert-butyl alcohol. The $ZnCl_2$ solution was added dropwise, with stirring (80 rpm), with a flow of 2–3 drops/second to the first solution. After the addition was complete, the suspension was stirred at 40° C. for 2 additional hours. The suspension was allowed to settle overnight, filtered, and washed. The washes were as follows in the order given: deionized $H_2O$(4×75 mL $H_2O$); 75 mL 25% tert-butyl alcohol in $H_2O$; 75 mL 1:1 tert-butyl alcohol in $H_2O$; and 75 mL tert-butyl alcohol. Then 1.5–2 g of precipitate was recrystallized from 30 mL $H_2O$ and 5 mL tert-butyl alcohol (60° C., 3 h). The precipitate was filtered as before. The final precipitate was dried in a vacuum oven, at 60° C. for 6–8 h.

Comparative DMC catalyst example two was prepared as described above for comparative example one up to the recrystallization step. An amount of 1.5 to 2.0 g of precipitate was recrystallized from $ZnCl_2$ (0.3 g, 0.0012 mol) dissolved in 30 mL $H_2O$ and 5 mL tert-butyl alcohol (60° C., 3 h). The final precipitate was filtered as before and dried in the vacuum oven, at 60° C. for 6–8 h.

Comparative DMC catalyst examples three and four were both prepared using the free hexacyanocobaltic acid $H_3[Co(CN)_6]$, obtained from $K_3[Co(CN)_6]$ which had been passed through an ion exchange column. The column and $H_3[Co(CN)_6]$ were prepared as follows. The ion exchange resin was Amberlyst 15, wet form from Aldrich Chemical Company, Inc. Milwaukee, Wis., USA. An amount of 175 g of wet resin (52–57% $H_2O$, 4.7 eq./kg) was suspended in 400 mL deionized $H_2O$. This provided 0.175×4.7×0.48=0.39 eq. for the column to be able to easily exchange 20 g of $K_3[Co(CN)_6]$ (# eq. $K^+$ (20×3)/332.35=0.18). The column was prepared by placing glass wool at the bottom of the column, followed by a bed of glass beads. The resin was carefully placed in the column, and most of the $H_2O$ drained until the water was level with the top of column. Then 10% HCl (150 mL=one bed volume) was added. The rate of solution passing through the column should be 1 bed volume in 15 min (3–4 drops/second), until the acid solution is level with top of column. The acid wash was followed by $H_2O$ washings (minimum 3–4, to pH>4). The first 2 bed volumes (150 mL) of $H_2O$ washing were at a rate of 4 bed volumes/hour (3–4 drops/second), followed by a rate of 10–12 bed volumes/hour (12 drops/second) for the remaining washings. There was always 1–2 inches of liquid on top of the resin.

Comparative DMC catalyst three was prepared as follows. A solution was prepared by dissolving 20 g of $K_3[Co(CN)_6]$ (0.06 mol) in 150 mL deionized $H_2O$. The solution was carefully poured on top of the column. A second solution was prepared by dissolving 10.25 g of $ZnCl_2$ (0.075 mol) in 100 mL water +100 mL tert-butyl alcohol in a 2,000 mL 4-neck flask. The solution was warmed with stirring to 40° C. Then the $H_3[Co(CN)_6]$ from the ion exchange column was added at 3 drops/sec, total 15 minutes, to the flask. The flow was stopped before the column ran dry. Then 2×150 mL of water was added to the column and the corresponding column volumes were added to the flask. Then 150 mL of water was added to the column and the column was flushed fast at 12 drops/sec. The pH of the solution coming out of the column at this point must be >4. The suspension formed in the 2,000 mL flask was stirred at 40° C. for 2 more hours. The suspension was filtered through a fine fritted funnel. The precipitate was collected and washed with deionized $H_2O$ (4×75 mL) followed by 75 mL 25% tert-butyl alcohol in $H_2O$, 75 mL 1:1 tert-butyl alcohol in $H_2O$ and 75 mL tert-butyl alcohol. About 2 g of filtercake material was placed into a 100 mL wideneck flask with a magnetic stirrer. Then 30 mL of water and 5 mL tert-butyl alcohol was added and the suspension stirred at 60° C. for 3 hrs. The suspension was cooled to room temperature and filtered. The filtrate was washed with tert-butyl alcohol. The filter cake was transferred to a drying dish and dried in a vacuum oven at 60° C. for >10 hrs. The dried cake was placed in a dessicator over $P_2O_5$. The final cake was ground into powder if necessary.

Comparative DMC catalyst four was prepared as follows. A solution was prepared by dissolving 20 g of $K_3[Co(CN)_6]$ (0.06 mol) in 150 mL deionized $H_2O$. The solution was carefully poured on top of the column. A second solution was prepared by dissolving 10.25 g of $ZnCl_2$ (0.075 mol) in 100 mL water in a 2,000 mL 4-neck flask. The solution was warmed with stirring to 40° C. Then the $H_3[Co(CN)_6]$ from the ion exchange column was added at 3 drops/sec, total 15 minutes, to the flask. The flow was stopped before the column ran dry. Then 2×150 mL of water was added to the column and the corresponding column volumes were added to the flask. Then 150 mL of water was added to the column and the column was flushed fast at 12 drops/sec. The pH of the solution coming out of the column at this point must be >4. The suspension formed in the 2,000 mL flask was stirred at 40° C. for 2 more hours. The suspension was filtered through a fine fritted funnel. The precipitate was washed with deionized $H_2O$ (4×75 mL). About 2 g of filtercake material was placed into a 100 mL wideneck flask with a magnetic stirrer. Then 20 mL of water and 10 mL of polyether polyol, an adduct of glycerine and propylene oxide monomer with a molecular weight of 422, was added and the suspension stirred at 60° C. for 3 hrs. The suspension was cooled to room temperature and filtered. The filtrate was washed with the same mixture of water and polyether polyol. The filter cake was transferred to a drying dish and dried in a vacuum oven at 60° C. for >10 hrs. The dried cake was placed in a dessicator over $P_2O_5$. The final cake was ground into powder if necessary.

Preparation of Polyethercarbonate Polyols

The multimetal cyanide compound of the present invention and the comparative DMC catalysts, described above, were used to prepare polyethercarbonate polyols using a general procedure described below.

A clean and dry 300 ml autoclave, equipped with an agitator, external heating, internal cooling via a cooling coil, a propylene oxide feed line, a carbon dioxide gas feed line, a temperature sensor and a pressure sensor, was charged with 70 g of a purified initiator polyol and the DMC catalyst of interest. The initiator used in these experiments was an adduct of glycerine and propylene oxide monomer with a number average molecular weight of 730, a water content <0.03% and a residual catalyst content <5 ppm. The initiator-catalyst mixture was heated to 130° C. under vacuum (<1 mm Hg) for 2 hours to remove any residual moisture. The vacuum system was disconnected and the reactor pressurized to 0 psi using Argon gas. Then 5 g of propylene oxide was added and the pressure increase in the reactor was monitored. Within 15–30 minutes the reactor pressure declines back to 0 psi, indicating that the DMC catalyst has been activated and is now active. Then 170 g propylene oxide (PO) monomer is added at 130° C. at a constant rate of 1 g/min. After 5 minutes of the PO feed, the reactor was pressurized with $CO_2$ gas (Air Products, research grade) for the duration of the PO feed. Following the completion of the PO addition step, unreacted monomer was left to react out at 130° C. The reactor was then vented and cooled and the product collected. The peak molecular weight and the weight average molecular weight were determined by gel permeation chromatography. The viscosity was measured using a Brookfield DV-III rheometer. The carbonate content of the polymer was determined by IR (peak at 1745 cm-1) and calculated as weight % $CO_3$ in the polymer. Propylene carbonate formed as a by-product was not removed.

Polyethercarbonate polyol example one according to the present invention was prepared using the multimetal cyanide compound prepared according to the present invention and the procedure described above as follows. An amount of 0.5 g of a suspension of the multimetal cyanide compound catalyst, 5% in a purified initiator polyol, which is an adduct of glycerine and propylene oxide monomer with a number average molecular weight 730, equal to 0.025 g of catalyst was used. The reaction temperature was 120° C. and the reactor was pressurized with $CO_2$ to 500 psi. The yield of the reaction product obtained was 273 g. Its peak molecular weight was 1,724, its weight average molecular weight 3,081. The product had a polydispersity Mw/Mn of 1.63. The polydispersity of a polyol is the weight average molecular weight (Mw) divided by the number average molecular weight (Mn). It is an indication of the breadth of the molecular weight distribution. A monodispersed polyol would have a value of 1.0. The viscosity of the product was 1,983 centipoise at 25° C. The carbonate content of the polyethercarbonate polyol was 9.3%.

Polyethercarbonate polyol example two according to the present invention was prepared similarly to example one except for the reaction temperature. The reaction temperature was 110° C. and the reactor was pressurized with $CO_2$ to 500 psi. The yield of the reaction product obtained was 283 g. Its peak molecular weight was 1,801, its weight average molecular weight 3,567. The product had a polydispersity Mw/Mn of 1.69. The viscosity of the product was 2,675 centipoise at 25° C. The carbonate content of the polyethercarbonate polyol was 11.4%.

In polyethercarbonate polyol example three according to the present invention the multimetal catalyst according to the present invention was used as a solid powder. An amount of 0.2 g of the multimetal catalyst powder was used.. The reaction temperature was 110° C. and the reactor was pressurized with $CO_2$ to 900 psi. The yield of the reaction product obtained was 284 g. Its peak molecular weight was 1,755 and its weight average molecular weight was 4,899. The product had a polydispersity Mw/Mn of 1.73. The viscosity of the product was 1,840 centipoise at 25° C. The carbonate content of the polyethercarbonate polyol was 13.2%.

Comparative polyethercarbonate polyol example one was prepared using comparative DMC catalyst one. An amount of 0.1 g of the comparative DMC catalyst example one was used as a solid powder, the reaction temperature was 130° C. and the reactor was pressurized with $CO_2$ to 900 psi. The yield of the reaction product obtained was 255 g. The product showed a bimodal molecular weight distribution with peak molecular weights at 810 and 6,896. Its weight average molecular weight was 14,537. Its polydispersity Mw/Mn was 2.99. The viscosity of the product was 11,225 centipoise at 25° C. The carbonate content of the polyol produced was 10.1%. Thus, by way of contrast this DMC catalyst produces a polyethercarbonate polyol product having a very broad molecular weight distribution and a much higher viscosity.

Comparative polyethercarbonate example two was prepared using comparative DMC catalyst one. An amount of, 0.1 g of the comparative DMC catalyst example 1 was used as a solid powder, the reaction temperature was 150° C. and the reactor was pressurized with $CO_2$ to 900 psi. The yield of the reaction product obtained was 255 g. The product showed a multimetal molecular weight distribution with a peak molecular weight at 4,211 and a weight average molecular weight of 6,156. Its polydispersity Mw/Mn was 2.53. The viscosity of the product was 1,305 centipoise at 25° C. The carbonate content of the polyol was 6.3%. Thus, even if the reaction temperature is increased the product is not as satisfactory. The product has a beneficially lower viscosity, but also a much lower carbonate content.

Comparative polyethercarbonate example three was prepared using comparative DMC catalyst one. An amount of, 0.5 g of the comparative DMC catalyst example 1 was used as a solid powder, the reaction temperature was 105° C. and the reactor was pressurized with $CO_2$ to 900 psi. The yield of the reaction product obtained was 228 g. The product showed a bimodal molecular weight distribution with peak molecular weights at 816 and 5,154. The weight average molecular weight was 7,868. Its polydispersity Mw/Mn was 3.85. The viscosity of the product was 12,138 centipoise at 25° C. The carbonate content of the polyol was 13.2%. Thus, while employing a significantly increased catalyst concentration while at the same timelowering the reaction temperature increased the carbonate content, but it also reduced the yield and significantly increased the viscosity of the product.

For comparative polyethercarbonate polyol four, 0.2 g of the comparative DMC catalyst two was used as a solid powder. The reaction temperature was 130° C. and the reactor was pressurized with $CO_2$ to 900 psi. The yield of the reaction product obtained was 261 g. The product showed a multimetal molecular weight distribution with a peak molecular weight at 4,016 and a weight average molecular weight of 5,866. Its polydispersity Mw/Mn was 2.37. Its carbonate content was 7.6%. The viscosity of the product was 3,857 centipoise at 25° C. Thus, this comparative catalyst produced a polyethercarbonate polyol with a broad molecular weight distribution, low yield, and higher viscosity.

For comparative polyethercarbonate polyol five, 0.2 g of the comparative DMC catalyst three was used as a solid powder. The reaction temperature was 130° C. and the reactor was pressurized with $CO_2$ to 900 psi. The yield of the reaction product obtained was 260 g. The product showed a bimodal molecular weight distribution with a peak molecular weight of 794 and a weight average molecular weight of 6,648. Its polydispersity Mw/Mn was 3.36. The viscosity of the product was 3,700 centipoise at 25° C. The carbonate content of the PEC polyol was 8.5%. Thus, this comparative DMC catalyst also produced a broad molecular weight distribution, low yield and a high viscosity.

For comparative polyethercarbonate polyol six, 0.2 g of the comparative DMC catalyst four was used as a solid powder. The reaction temperature was 130° C. and the reactor was pressurized with $CO_2$ to 900 psi. The yield of the reaction product obtained was 180 g. The product showed a broad molecular weight distribution with a peak molecular weight at 819 and a weight average molecular weight of 7,878. Its polydispersity Mw/Mn was 5.52. Its carbonate content was 6.9%. The viscosity of the product was 635 centipoise at 25° C. Thus, this comparative DMC catalyst produced a low yield of the desired polyethercarbonate polyol product as a result of an incomplete reaction.

Scaled Up Preparation of Polyethercarbonates

In the next series of experiments, the polyethercarbonate polyol formation reaction was scaled up to a larger two gallon autoclave using a multimetal cyanide compound prepared according to the present invention. The general procedure was as described below. A clean and dry 2 gallon autoclave, equipped with an agitator, external heating, internal cooling via a cooling coil, a PO feed line, a gas feed line, a temperature sensor and a pressure sensor, was charged with a purified initiator polyol, described above, and the multimetal cyanide compound catalyst prepared according to the present invention.. The initiator-catalyst mixture is heated to 130° C. under vacuum (<1 mm Hg) for 2 hours to remove any residual moisture. The vacuum system is disconnected and the reactor pressurized to 0 psi using Argon gas. Then 200 g of propylene oxide is added and the pressure increase in the reactor is monitored. Within 15–30 minutes the reactor pressure declines back to 0 psi, indicating that the multimetal cyanide compound catalyst is active. An amount of 2,500 g of PO monomer is then added at 130° C. at a constant rate over 3 hours. At 10 minutes after commencement of the PO feed, the reactor is pressurized with $CO_2$ gas (Air Products, research grade) for the duration of the PO feed and the PO reaction. Following the completion of the PO addition step, unreacted monomer is left to react out at 130° C. The reactor is then vented and cooled and the product collected. The peak molecular weight and the weight average molecular weight were determined by gel permeation chromatography. The viscosity was measured using a Brookfield DV-III rheometer. The carbonate content of the polymer was determined by IR (peak at 1745 cm-1) and calculated as weight % $CO_3$ in the polymer. The product was filtered using 3% diatomaceous earth filter aid. Propylene carbonate formed as a by-product was removed.

Polyethercarbonate polyol example four prepared according to the present invention was prepared as follows. An amount of 1,000 g of the purified initiator polyol, described above, and 20 g of a suspension of the DMC catalyst, 5% in the purified initiator polyol, which is 0.025 g catalyst, were used. The reaction temperature was 130° C. and the reactor was pressurized with $CO_2$ to 1,134 psi through the slow addition of 1,000 g $CO_2$. The yield of the reaction product obtained was 4,055 g. Its peak molecular weight was 1,778 and its weight average molecular weight was 4,077. Its polydispersity Mw/Mn was 1.62. The viscosity of the crude product was 2,635 centipoise at 25° C. The viscosity of the product after propylene carbonate removal was 4,870 centipoise at 25° C. The carbonate content of the polyethercarbonate polyol was 9.9%.

Polyethercarbonate polyol example five prepared according to the present invention was prepared as follows. An amount of 900 g of the purified initiator polyol and 20 g of a suspension of the DMC catalyst, described above, were used. The reaction temperature was 110° C. and the reactor was pressurized with $CO_2$ to 200 psi. The yield of the reaction product obtained was 3,564 g. Its peak molecular weight was 2,562 and its weight average molecular weight was 3,057. Its polydispersity Mw/Mn was 1.16. The viscosity of the crude product was 760 centipoise at 25° C. The carbonate content of the polyethercarbonate polyol was 2.6%.

Polyethercarbonate polyol example six prepared according to the present invention was prepared as follows. An amount of 1,000 g of the purified initiator polyol and 20 g of a suspension of the DMC catalyst, described above, were used. The reaction the reaction temperature was 130° C. and the reactor was pressurized with $CO_2$ to 500 psi. The yield of the reaction product obtained was 3,859 g. Its peak molecular weight was 2,111 and its weight average molecular weight was 2,990. Its polydispersity Mw/Mn was 1.26. The viscosity of the crude product was 1,230 centipoise. at 25° C. The carbonate content of the polyethercarbonate polyol was 5.8%.

Polyethercarbonate polyol example seven prepared according to the present invention was prepared as follows.

An amount of 900 g of the purified initiator polyol and 20 g of a suspension of the DMC catalyst, described above, were used. The reaction the reaction temperature was 110° C. and the reactor was pressurized with $CO_2$ to 700 psi. The yield of the reaction product obtained was 4,156 g. Its peak molecular weight was 2,056 and its weight average molecular weight was 3,694. Its polydispersity Mw/Mn was 1.39. The viscosity of the crude product was 2,510 centipoise at 25° C. The carbonate content of the polyethercarbonate polyol was 11.9%.

Polyethercarbonate polyol example eight prepared according to the present invention was prepared as follows. An amount of 900 g of the purified initiator polyol and 20 g of a suspension of the DMC catalyst, described above, were used. The reaction the reaction temperature was 110° C. and the reactor was pressurized with $CO_2$ to 1490 psi The yield of the reaction product obtained was 4,473 g. Its peak molecular weight was 1,839 and its weight average molecular weight was 3,755. Its polydispersity Mw/Mn was 1.46. The viscosity of the crude product was 5,170 centipoise at 25° C. The carbonate content of the polyethercarbonate polyol was 16.9%.

Polyethercarbonate polyol example nine prepared according to the present invention was prepared as follows. An amount of 900 g of the purified initiator polyol and 20 g of a suspension of the DMC catalyst, described above, were used. The reaction the reaction temperature was 110° C. and the reactor was pressurized with $CO_2$ to 2410 psi. The yield of the reaction product obtained was 4,661 g. Its peak molecular weight was 1,941 and its weight average molecular weight was 4,162. Its polydispersity Mw/Mn was 1.58. The viscosity of the crude product was 6,450 centipoise at 25° C. The carbonate content of the polyethercarbonate polyol was 18.9%.

Examples five through nine clearly show how using the multimetal cyanide compound catalysts described herein, $CO_2$ incorporation into the desired polyethercarbonate polyol products can readily be controlled via the $CO_2$ pressure. The yield and carbonate content increase with increasing $CO_2$ pressure. Catalyst activity does not decrease with increasing carbon dioxide load, the same low concentration of the multimetal cyanide compound catalyst is used throughout the series of increasing $CO_2$ pressure and corresponding carbonate content. In addition, polydispersity and viscosities of the polyethercarbonate polyol products remain low even at increasing $CO_2$ process pressure and corresponding increasing $CO_2$ incorporation rates. The examples one through nine clearly demonstrate the superiority of the present multimetal cyanide compound in the formation of polyethercarbonate polyolss versus a variety of previous DMC catalysts.

Preparation of a Foam Using a Polyethercarbonate Polyol

In a final comparative test the polyethercarbonate polyol of example four above was compared to a standard polyether alcohol in the formation of a flexible polyurethane foam. The standard polyether alcohol was a glycerine propylene oxide adduct having a molecular weight of 2,640. The resin component of each foam was premixed and then the isocyanate component was added with intensive mixing. The reaction times and a variety of foam properties were compared. The resin component for each was as follows: 400.00 g of polyol, 1.00 g of Dabco® 33-LV catalyst, 4.00 g of BF-2370 silicone foam stabilizer, 16.00 g of water and 1.80 g of stannous octoate catalyst T-10 for a total resin weight of 422.80 g. The isocyanate used was toluene diisocyanate (2,4-toluenediisocyanate: 2,6-toluenediisocyanate=80:20) in an amount of 210.3 g. Each foam had a mix time of 8 seconds and a cream time of 9 seconds. The foam prepared with the polyethercarbonate polyol had a rise time of 93 seconds. The foam prepared with the comparative polyether alcohol had a rise time of 90 seconds. Both foams were subsequently kept at a temperature of 200° F. for a period of 24 hours. The physical properties of the foams are presented below in Table 1. The foam prepared with the polyethercarbonate polyol had improved properties compared to the foam made with the polyether alcohol.

TABLE 1

| Property | Polyethercarbonate polyol foam | Polyether alcohol foam |
|---|---|---|
| Density, pounds per cubic foot | 1.45 | 1.47 |
| Hardness 25% IFD, lbf | 38.9 | 40.5 |
| Hardness 65% IFD, lbf | 75.9 | 74.6 |
| Air flow, cubic foot per meter | 5.0 | 3.9 |
| Original peak tensile, psi | 13.4 | 12.6 |
| Heat aged peak tensile, psi | 16.5 | 14.1 |
| Original 50% CFD, psi | 0.66 | 0.64 |
| Humid aged 50% CFD, psi | 0.64 | 0.59 |
| Humid aged CFD (% of Original) | 96.7 | 91.3 |

While the preferred embodiment of the present invention has been described so as to enable one skilled in the art to practice the present invention, it is to be understood that variations and modifications may be employed without departing from the concept and intent of the present invention as defined in the following claims. The preceding description is intended to be exemplary and should not be used to limit the scope of the invention. The scope of the invention should be determined only by reference to the following claims.

What is claimed is:

1. A method of forming a polyethercarbonate polyol comprising the steps of:
    a) providing a catalyst consisting essentially of a multimetal cyanide compound having a crystalline structure and a content of platelet-shaped particles of at least 30% by weight, based on the weight of the multimetal cyanide compound and further consisting essentially of at least two of the following: at least one organic complexing agent, water, at least one polyether, and at least one surface-active substance; and
    b) reacting an alcohol initiator with at least one alkylene oxide and carbon dioxide under a positive pressure in the presence of the multimetal cyanide compound, thereby forming a polyethercarbonate polyol having a polydispersity of less than or equal to about 1.73.

2. The method of claim 1, wherein step b) comprises reacting an alcohol initiator having a functionality of from 1 to 8 with at least one alkylene oxide and carbon dioxide under a positive pressure in the presence of said multimetal cyanide compound.

3. The method of claim 1, wherein step b) comprises reacting an alcohol initiator having a functionality of from 1 to 4 with at least one alkylene oxide and carbon dioxide under a positive pressure in the presence of said multimetal cyanide compound.

4. The method of claim 1, wherein step b) further comprises reacting an alcohol initiator having a functionality of from 1 to 8 with at least one first alkylene oxide to form an oligomer and then reacting the oligomer with at least one second alkylene oxide and carbon dioxide under a positive pressure in the presence of said multimetal cyanide compound.

5. The method of claim 1, wherein step b) comprises reacting an alcohol initiator with a plurality of alkylene oxides and carbon dioxide under a positive pressure in the presence of said multimetal cyanide compound.

6. The method of claim 1, wherein step b) comprises reacting an alcohol initiator with propylene oxide and carbon dioxide under a positive pressure in the presence of said multimetal cyanide compound.

7. The method of claim 1, wherein step b) comprises reacting an alcohol initiator with at least one alkylene oxide and carbon dioxide under a positive pressure of from 10 to 3,000 psi in the presence of said multimetal cyanide compound.

8. The method of claim 1, wherein step b) comprises reacting an alcohol initiator with at least one alkylene oxide and carbon dioxide under a positive pressure of from 90 to 2,500 psi in the presence of said multimetal cyanide compound.

9. The method of claim 1, wherein step b) comprises reacting an alcohol initiator with at least one alkylene oxide and carbon dioxide under a positive pressure of from 90 to 2,000 psi in the presence of said multimetal cyanide compound.

10. The method of claim 1, wherein step b) comprises reacting an alcohol initiator with at least one alkylene oxide and carbon dioxide under a positive pressure in the presence of said multimetal cyanide compound at a temperature of from 40 to 180° C.

11. The method of claim 1, wherein step b) comprises reacting an alcohol initiator with at least one alkylene oxide and carbon dioxide under a positive pressure in the presence of said multimetal cyanide compound at a temperature of from 90 to 130° C.

12. The method of claim 1, wherein step b) comprises reacting an alcohol initiator with at least one alkylene oxide and carbon dioxide under a positive pressure in the presence of said multimetal cyanide compound to produce a polyethercarbonate polyol having a carbonate content of from 1 to 30% calculated as the weight percent $CO_3$ in the polyethercarbonate polyol.

13. The method of claim 1, wherein step b) comprises reacting an alcohol initiator with at least one alkylene oxide and carbon dioxide under a positive pressure in the presence of said multimetal cyanide compound to produce a polyethercarbonate polyol having a carbonate content of from 2 to 20% calculated as the weight percent $CO_3$ in the polyethercarbonate polyol.

14. The method of claim 1, wherein step b) comprises reacting an alcohol initiator with at least one alkylene oxide and carbon dioxide under a positive pressure in the presence of said multimetal cyanide compound to produce a polyethercarbonate polyol having a carbonate content of from 5 to 15% calculated as the weight percent $CO_3$ in the polyethercarbonate polyol.

15. The method of claim 1, wherein step b) comprises reacting an alcohol initiator with at least one alkylene oxide and carbon dioxide under a positive pressure in the presence of said multimetal cyanide compound to produce a polyethercarbonate polyol having a number average molecular weight of from 200 to 20,000 Daltons.

16. The method of claim 1, wherein step b) comprises reacting an alcohol initiator with at least one alkylene oxide and carbon dioxide under a positive pressure in the presence of less than or. equal to 1.0% by weight based on the weight of the polyethercarbonate polyol of said multimetal cyanide compound.

17. The method of claim 1, wherein step b) comprises reacting an alcohol initiator with at least one alkylene oxide and carbon dioxide under a positive pressure in the presence of less than or equal to 0.5% by weight based on the weight of the polyethercarbonate polyol of said multimetal cyanide compound.

18. The method of claim 1, wherein step b) comprises reacting an alcohol initiator with at least one alkylene oxide and carbon dioxide under a positive pressure in the presence of less than or equal to 0.02% by weight based on the weight of the polyethercarbonate polyol of said multimetal cyanide compound.

19. The method of claim 1, wherein step a) comprises providing a catalyst consisting essentially of a multimetal cyanide compound having a crystalline structure and a content of platelet-shaped particles of at least 50% by weight, based on the weight of said multimetal cyanide compound and consisting essentially of at least two of the following: at least one organic complexing agent, water, at least one polyether, and at least one surface-active substance.

20. The method of claim 1, wherein step a) comprises providing a catalyst consisting essentially of a multimetal cyanide compound having a crystalline structure and a content of platelet-shaped particles of at least 70% by weight, based on the weight of said multimetal cyanide compound and further consisting essentially of at least two of the following: at least one organic complexing agent, water, at least one polyether, and at least one surface-active substance.

* * * * *